G. SCHNEIDER.
AUTOMOBILE LOCK.
APPLICATION FILED JULY 25, 1917.
1,269,318.
Patented June 11, 1918.
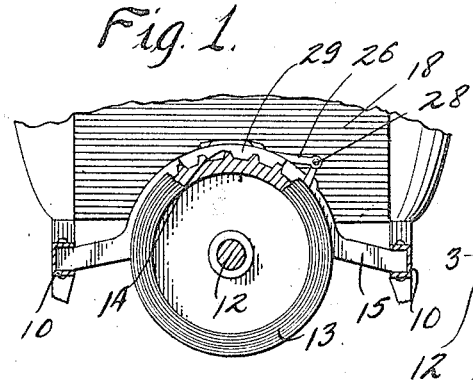
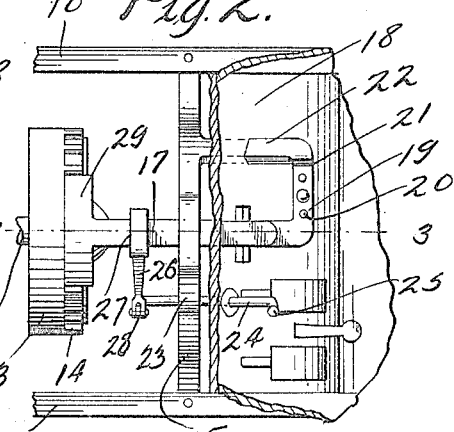
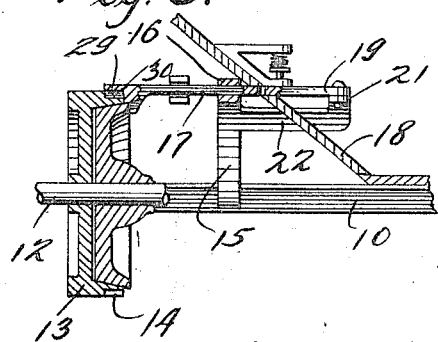
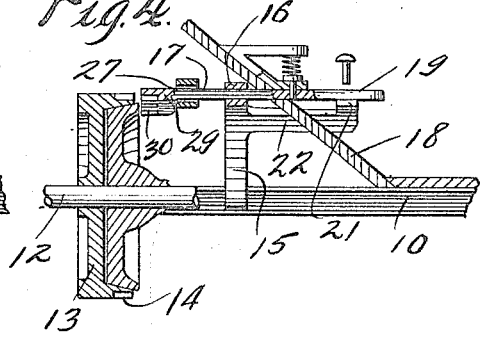
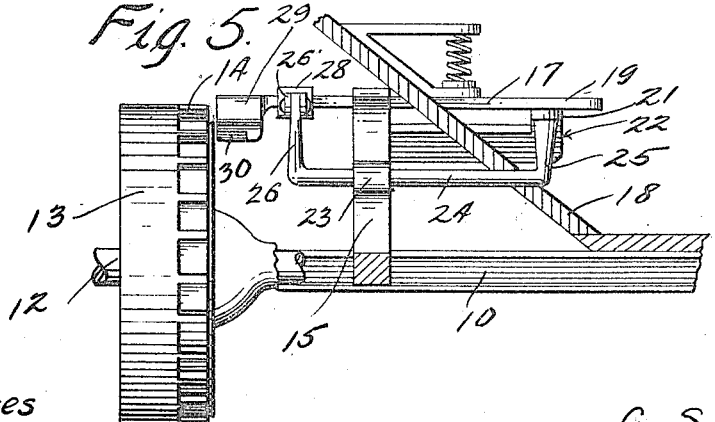
Witnesses
G. C. Walling
N. M. Test
Inventor
G. Schneider
By Chandler & Chandler
Attorney

UNITED STATES PATENT OFFICE.

GEORGE SCHNEIDER, OF CLEVELAND, OHIO.

AUTOMOBILE-LOCK.

1,269,318.   Specification of Letters Patent.   Patented June 11, 1918.

Application filed July 25, 1917.   Serial No. 182,695.

*To all whom it may concern:*

Be it known that I, GEORGE SCHNEIDER, a citizen of the United States, residing at Cleveland, in the county of Cuyahoga, State of Ohio, have invented certain new and useful Improvements in Automobile-Locks; and I do hereby declare the following to be a full, clear, and exact description of the invention, such as will enable others skilled in the art to which it appertains to make and use the same.

This invention relates to new and useful improvements in locks and particularly to automobile locks.

One object of the present invention is to provide a locking means whereby the engine shaft will be positively held against rotation, thus effectively preventing the theft of the automobile.

Another object of the present invention is to provide a novel and simple locking means which can be conveniently manipulated from the seat of the automobile.

Other objects and advantages will be apparent from the following description when taken in connection with the accompanying drawing.

In the drawing:

Figure 1 is an end view of the fly wheel of the engine shaft of an automobile the shaft being shown in section, and the lock being shown in elevation.

Fig. 2 is a top plan view of the locking device shown in connection with the fly wheel and necessary parts of the automobile.

Fig. 3 is a longitudinal sectional view taken on the line 3—3 of Fig. 2, the lock being in operative position.

Fig. 4 is a similar sectional view showing the lock in inoperative position.

Fig. 5 is a side elevation of the device in inoperative position.

Referring particularly to the accompanying drawing 10 represents the side portions or bars of the chassis of the automobile between which is disposed the engine shaft 12 which carries the fly wheel 13. The shaft is broken away at both ends, as well as the means which support the shaft, so that the locking mechanism will be better shown. Formed on the peripheral face of the fly wheel are the teeth 14 which are arranged in a circular series thereon. Extending transversely between the side bars 10 and secured at its ends thereto, is an arched member 15, in the intermediate portion of which there is formed an opening 16, said opening being slightly elongated for a purpose which will appear hereinafter. Slidable through this opening 16 is a rod 17 which is square or angular in cross section, said rod extending rearwardly through the footboard 18 of the automobile where it is formed with a laterally turned and flattened handle portion 19. This portion 19 is formed with the vertical openings 20 for registration with similar opening formed in the adjacent flattened end 21 of an arm 22 which extends rearwardly from the upper portion of the arched member 15. Through these openings, when in registry, a lock of any suitable type, such as a padlock, may be engaged, thus holding the rod 17 against longitudinal movement.

A bearing bracket 23 is mounted on the upper portion of the arched member 15, and through this bracket is slidable a rod 24, the rear end of which extends to a point adjacent the handle member 19, where it is provided with a laterally turned handle portion 25. Formed on the forward portion of the rod 24, which extends forwardly of the arched member, there is an upwardly and transversely extending arm 26. The outer end of this arm is formed with a longitudinal opening 27 through which the rod 17 is disposed. The intermediate portion of the rod 24 is loosely mounted for rocking movement laterally in the said bearing bracket 23. The arm 26 is connected to the rod 24 by means of the pivot 28, whereby when the handle 25 is turned the arm will be moved in a direction transversely of the rod 17 and cause the transverse sliding movement of said rod. On the forward end of the rod 17 there is secured an arcuate member 29 on the inner curved face of which are formed the teeth 30, these teeth being arranged for meshing engagement with the teeth of the fly wheel.

From the foregoing it will be seen that by rocking the rod 24 by means of the handle thereof the toothed arcuate member can be so placed that when the rod 17 is pushed inwardly the teeth of the said arcuate member will properly enter between the teeth of the fly wheel. Then, when the padlock is engaged through the handle member of the rod 17 and the flattened portion of the arm 22 the rotary movement of the fly wheel is effectively prevented, and the starting of the engine impossible. Thus the theft of the automobile can not take place, by reason of the fact that the operation of the engine is necessary to the movement of the car.

What is claimed is:

1. In a locking device for an automobile, the combination with the fly wheel of the engine of the automobile, said fly wheel having teeth on the periphery thereof, a toothed member movable axially with respect to the fly wheel into and out of engagement with the toothed periphery thereof, means for automatic engagement with said toothed member to hold the toothed member in engagement with the fly wheel.

2. In a locking device for an automobile, the combination with the fly wheel of the engine of the automobile, said fly wheel having peripheral teeth thereon, an internally toothed arcuate member movable axially with respect to the wheel into and out of engagement with the toothed periphery thereof, said toothed member including a stem having an aperture, supporting means for the stem having an aperture for registry with the aperture of the stem, and an automatic locking means engageable through the registered apertures of the support and stem when the arcuate member engages with the teeth of the fly wheel.

In testimony whereof, I affix my signature in the presence of two witnesses.

GEORGE SCHNEIDER.

Witnesses:
EWALD SCHNEIDER,
HERBERT LIGHTNER.